United States Patent [19]

Singh

[11] 3,841,658

[45] Oct. 15, 1974

[54] SEAT BELT SYSTEM
[75] Inventor: Harkrishan Singh, Dearborn Heights, Mich.
[73] Assignee: Ford Motor Company, Dearborn, Mich.
[22] Filed: Dec. 26, 1973
[21] Appl. No.: 428,528

[52] U.S. Cl............................ 280/150 S B, 297/388
[51] Int. Cl............................................... B60r 21/10
[58] Field of Search....... 280/150 S B; 297/388, 389

[56] References Cited
UNITED STATES PATENTS
3,415,538  12/1968  Radke.......................... 280/150 S B
3,437,349  4/1969   Feles............................. 280/150 SB
3,606,456  9/1971   Cazabon....................... 280/150 S B Primary Examiner—Robert R. Song
Attorney, Agent, or Firm—Keith L. Zerschling; John J. Roethel

[57] ABSTRACT

A seat belt system comprising a grommet flushly mounted in a vehicle seat cushion to receive a boot encased buckle device. The encased buckle device is loosely held by its own weight within the grommet and is secured to one end of a fixed length seat belt segment. An anchor means secures the other end of the fixed length seat belt segment to a vehicle floor member beneath the seat. The fixed length seat belt segment is of sufficient length to provide a predetermined amount of slack therein when the buckle device is contained within the grommet.

An elongated tongue member is carried on at least one seat belt segment connected to a retractor mechanism. The elongated tongue member is insertable into the grommet contained buckle device for latching engagement therewith. The buckle device when latched to the tongue member is partially extracted from the grommet in response to retractor force transmited through the retractor mechanism connected seat belt segment. The extent that the buckle device is extracted is controlled by the slack in the fixed belt segment. The amount of slack taken up is sufficinet to provide free access to the buckle device latch mechanism for releasing the latter.

5 Claims, 4 Drawing Figures

PATENTED OCT 15 1974  3,841,658
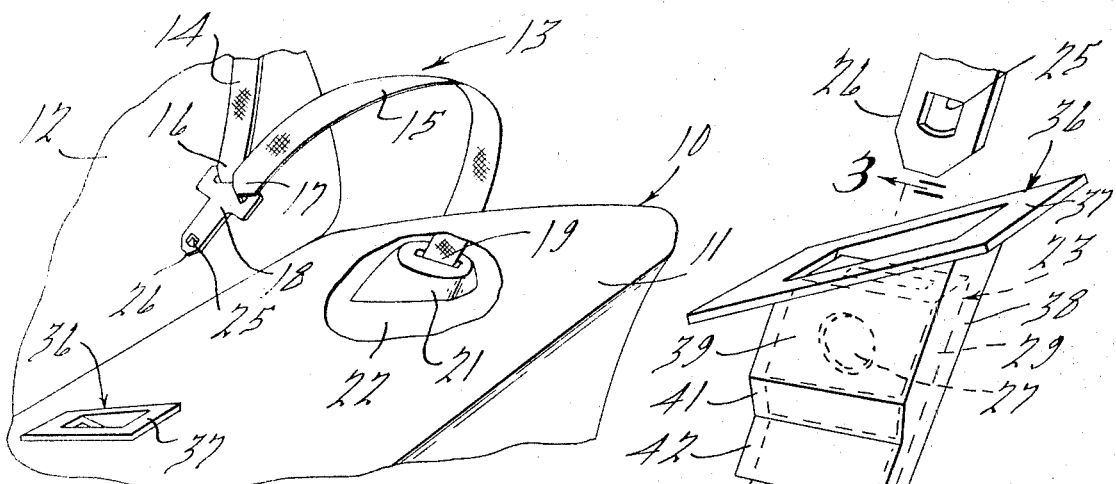
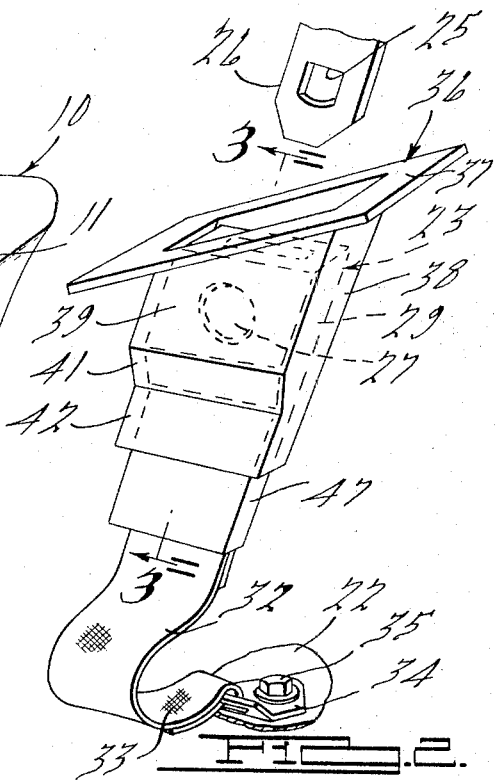
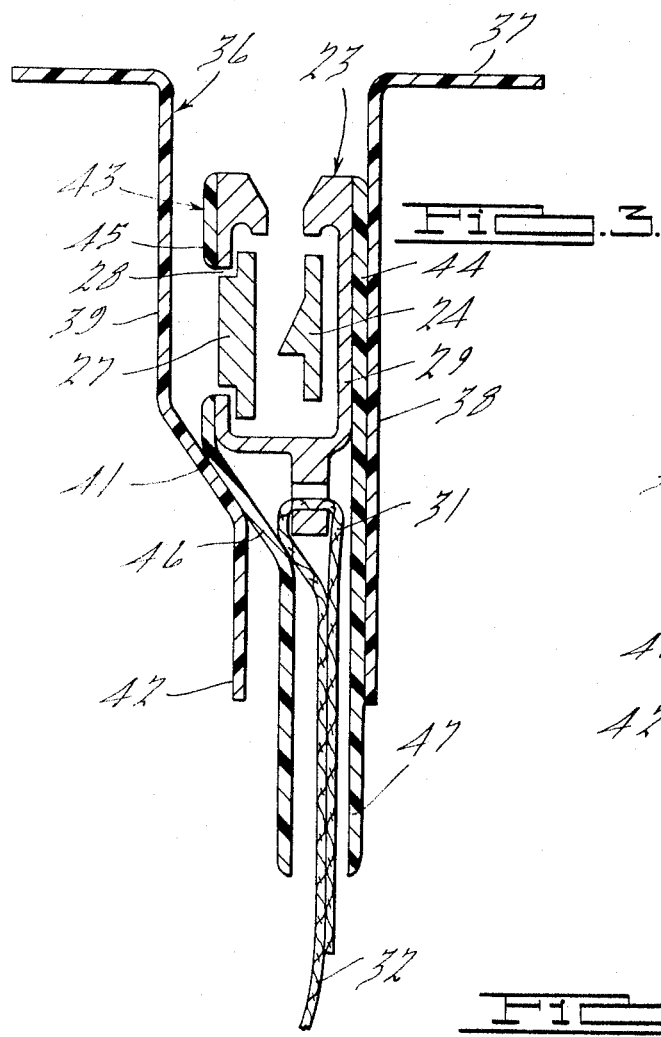
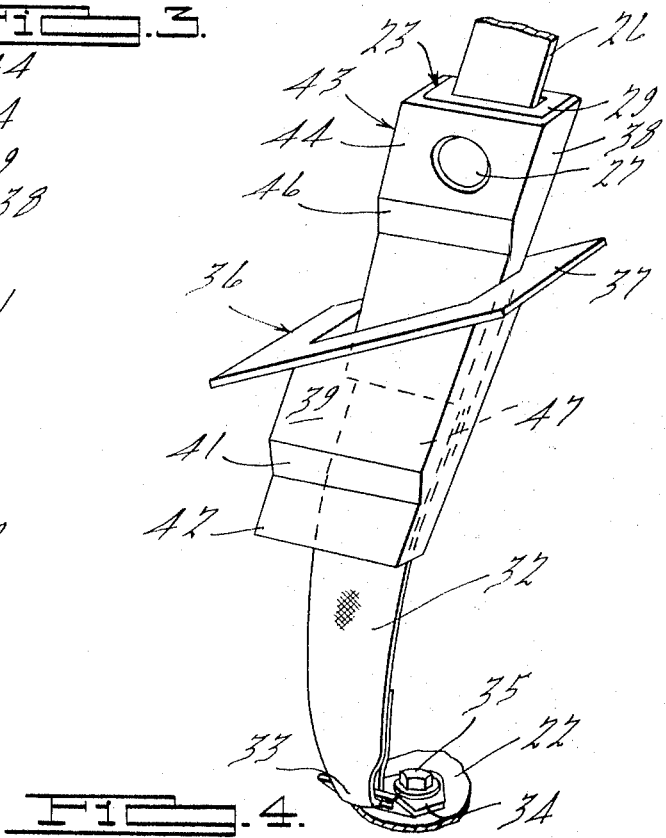

SEAT BELT SYSTEM

BACKGROUND OF THE INVENTION

As noted in U.S. Pat. No. 3,606,456 for a "Seatbelt System" as patented on Sept. 20, 1971 by Dennis C. Cazabon, one of the undesirable aspects of passenger restraint systems embodying seat belts and shoulder harnesses is an unsightly and inconvenient clutter of buckle and tongue devices. When not in use, the various buckle and tongue devices are loosely stowed on the vehicle seat cushions where they frequently get in the way of persons entering or leaving the seating area.

In the patented system, provision was made for receiving a tongue element in a buckle device mounted within the seat back structure. The restraint harness was a single belt coupled to a floor mounted retractor mechanism. In use, the belt was pulled up and across the chest of the seat occupant and the buckle device was passed over the occupant's shoulder into an aperture in the seat back leading to the concealed buckle device. This arrangement, however, is not compatible with current restraint systems of the three-point type utilizing a shoulder harness and a lap belt connected to a common tongue element adapted to be coupled to a buckle device tethered to the vehicle floor.

Accordingly, it is an object of the present invention to provide a grommet flushly mounted in a seat cushion adapted to house a buckle device below the cushion surface, the buckle device being adapted to readily receive and latch on to a tongue element and to be positioned after latching engagement for easy release of the buckle device latching mechanism.

SUMMARY OF THE INVENTION

The present invention relates to a seat belt system for a vehicle seat having a substantially horizontal seat cushion and comprises a grommet means flushly mounted in the seat cushion, a buckle device having a latch mechanism and boot means encasing the buckle device. The encased buckle device is loosely held by its own weight within the grommet means and is secured to one end of a fixed length seat belt segment. An anchor means secures the other end of the fixed length seat belt segment to a vehicle floor member beneath the seat. The fixed length seat belt segment is of sufficient length to provide a predetermined amount of slack therein when the buckle device is contained within the grommet means. An elongated tongue means is carried on at least one seat belt segment connected to a retractor mechanism. The elongated tongue means is insertable into the grommet contained buckle device for latching engagement with the latter. The buckle device when latched to the tongue means is partially extractable from the grommet means in response to retractor force transmitted through the retractor mechanism connected seat belt segment. The extent of buckle device extraction is controlled by the slack in the fixed belt segment and is generally sufficient to provide access to the buckle device latch mechanism for release of the latter.

Preferably, the grommet means and the boot means encasing the buckle device are made of a rigid plastic having a low coefficient of friction.

DESCRIPTION OF THE DRAWING

Other objects, advantages and features of the present invention can be made more apparent as this description proceeds, reference being had to the accompanying drawing, wherein:

FIG. 1 is a perspective view of a part of a vehicle seat and seat belt system as embodied in the present invention;

FIG. 2 is an enlarged view of the grommet containing the buckle device and illustrating the slack in the belt segment attaching the buckle device to the vehicle floor;

FIG. 3 is a sectional view on the line 3—3 of FIG. 2; and

FIG. 4 is a view in part similar to FIG. 2 showing the buckle device partially retracted from the grommet.

DETAILED DESCRIPTION OF THE INVENTION

Referring now to the drawing, and first to FIG. 1, there is shown a part of a vehicle seat 10 having a seat cushion 11 and a back rest 12. Overlying the seat 10 is a seat belt system, generally designated 13, for restraining a seat occupant in the seat under adverse vehicle operating conditions. The illustrated seat belt system 13 comprises a shoulder harness, partially indicated at 14, and a lap belt 15. The inboard terminal ends 16 and 17, respectively, of the shoulder harness 14 and lap belt 15 are coupled to a common, elongated, tongue element 18.

The outboard terminal end 19 of the lap belt 15 is coupled to a seat belt retractor mechanism 21 shown mounted on the vehicle floor 22 at one side of the seat cushion 11. The shoulder harness 14 may also be coupled to a retractor mechanism (not shown).

To complete the seat belt system 13, the tongue element 18 is adapted to be coupled to a buckle device 23. The buckle device 23 is of conventional design having a latch plate 24 adapted to engage a striker aperture 25 in the pilot end 26 of the tongue element 18. The latch plate 24 is moved to nonlatching or latch-released position by a push button 27 accessible through an aperture 28 in the buckle device casing 29.

The buckle device 23 is secured to the upper looped terminal end 31 of a fixed length belt segment 32. The lower looped terminal end 33 of the belt segment 32 is coupled to an anchor plate 34 adapted to be secured to the vehicle floor 22 by a bolt 35.

The seat belt system 13 as described is conventional. One of the undesirable aspects of such a system is the clutter of seat belt buckle devices on the top of the seat cushion 11 when not in use. The present invention eliminates seat cushion surface stowage of the buckle device. This is accomplished by providing a flush mounted grommet 36 having a flange 37 lying in or immediately on the cushion 11 surface and having a substantially rectangular tubular body portion 38. One side wall 39 of the body portion 38 has an inclined portion 41 intermediate the side wall ends causing a reduction in cross section area for about a fourth of the length of the tubular body portion at its lower end 42.

The buckle device 23 is encased in a boot 43, preferably plastic, open at both ends. The boot 43 is complementary in shape to the grommet 36. Its upper portion 44 which directly encases the buckle device 23 has an opening in its wall 45 providing access to the latch release push button 27. The wall portion 44 is integral with a tapered wall portion 46 which has substantially the same angle of inclination as the inclined wall portion 39 of the grommet. It will be readily apparent that the tapered wall portion 46 on the boot 43 coacting with the inclined wall 41 on the grommet body portion 44 of the grommet 36 functions as a stop means limiting the depth to which the buckle device 23 will be housed within the grommet.

The boot 43 has an elongated pilot portion 47 which, as best seen in FIG. 3, extends a substantial distance below the lower end 42 of the grommet 36.

Referring now to FIG, 2 the buckle device 23 is shown wholly contained within the grommet 36 just prior to its latching engagement with the elongated tongue element 18. The belt segment 32 is shown in a slack or flexed condition. As the tongue element 18 is inserted in the buckle device 23, any downward force on the buckle device is resisted by the abutting inclined surfaces 41–46 of the grommet 36 and the boot 43.

Upon release of the downward insertion force on the tongue element 18, the retractor mechanisms acting on the belt segments 14–15 will take up the slack in the belt system. This take-up action includes the slack in the belt section 32. In effect, an extraction force is applied to the buckle device 23 tending to withdraw it from the grommet 36, as seen in FIG. 4. Such extraction or withdrawal is necessary to provide access to the push button 27 for releasing the latch plate 24 when the seat occupant desires to remove the restraining belt system.

The slack in the belt segment 32 controls the extent of extraction or withdrawal of the buckle device 23. In turn, the length of the pilot end 47 of the buckle device 23 encasing boot 43 is coordinated with the amount of withdrawal movement permitted by the slack in belt section 32. This is necessary to ensure that a sufficient portion of the lower end 47 of the boot 43 remains within the grommet 36 to guide the buckle device 23 under its own weight back to its wholly contained position within the grommet after the tongue element 18 is disengaged from the buckle device 23.

Preferably, both the grommet 36 and the buckle device encasing boot 44 are made of a suitable plastic providing low frictional resistance to movement of the buckle device 23 between the positions shown in FIGS. 2 and 4.

It will be understood that the invention is not to be limited to the exact construction shown and described but that various changes and modifications may be made without departing from the spirit and scope of the invention.

I claim:

1. A seat belt system for a vehicle seat having a substantially horizontal seat cushion, comprising:

grommet means flushly mounted in the seat cushion, a buckle device having a latch mechanism, boot means encasing the buckle device, the encased buckle device in unbuckled condition of the seat belt system being loosely held by its own weight within the grommet means and being secured to one end of a fixed length seat belt segment, anchor means securing the other end of the fixed length seat belt segment to a vehicle floor member beneath the seat, the fixed length seat belt segment being of sufficient length to provide a predetermined amount of slack therein when the buckle device is contained within the grommet means, and an elongated tongue means carried on at least one seat belt segment connected to a retractor mechanism, the elongated tongue means being insertable into the grommet contained buckle device for latching engagement therewith, the buckle device when latched to the tongue means being partially extractable from the grommet means in response to retractor force transmitted through the retractor mechanism connected seat belt segment, the extent of buckle device extraction being controlled by the slack in the fixed belt segment and being sufficient to provide access to the buckle device latch mechanism for release of the latter.

2. A seat belt system according to claim 1, in which:

the grommet means comprises a substantially rectangular tubular body portion surmounted by a flange, the flange lying flat on the surface of the seat cushion and the body portion extending through the seat cushion.

3. A seat belt system according to claim 2, in which:

the grommet means and boot means have connecting stop means limiting the depth to which the encased buckle device is insertable into the grommet means.

4. A seat belt system according to claim 3, in which:

the boot means has an elongated pilot portion below the stop means, the pilot portion projecting below the grommet means body portion when the buckle device is wholly contained within the grommet means.

5. A seat belt system according to claim 4, in which:

the grommet means and the boot means encasing the buckle device are plastic.

* * * * *